(12) United States Patent
Ito

(10) Patent No.: US 9,858,499 B2
(45) Date of Patent: Jan. 2, 2018

(54) IMAGE PROCESSOR, NON-TRANSITORY COMPUTER READABLE MEDIUM AND OBJECT MATCHING DEVICE

(71) Applicant: Kensuke Ito, Yokohama (JP)

(72) Inventor: Kensuke Ito, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 346 days.

(21) Appl. No.: 14/257,520

(22) Filed: Apr. 21, 2014

(65) Prior Publication Data

US 2014/0226020 A1  Aug. 14, 2014

Related U.S. Application Data

(63) Continuation-in-part of application No. PCT/JP2012/067089, filed on Jul. 4, 2012.

(30) Foreign Application Priority Data

Jan. 5, 2012  (JP) .................................. 2012-000524

(51) Int. Cl.
| | | |
|---|---|---|
| *H04N 7/18* | (2006.01) | |
| *G06K 9/62* | (2006.01) | |
| *G01B 11/26* | (2006.01) | |
| *G06K 9/32* | (2006.01) | |
| *G06T 7/00* | (2017.01) | |
| *G06T 7/32* | (2017.01) | |
| *G06K 9/00* | (2006.01) | |

(52) U.S. Cl.
CPC ............ *G06K 9/6202* (2013.01); *G01B 11/26* (2013.01); *G06K 9/3208* (2013.01); *G06T 7/001* (2013.01); *G06T 7/32* (2017.01); *G06K 9/00577* (2013.01)

(58) Field of Classification Search
CPC .................................................... G06K 9/6202
USPC .......................................................... 348/161
See application file for complete search history.

(56) References Cited

U.S. PATENT DOCUMENTS

| | | | |
|---|---|---|---|
| 5,094,786 A | 3/1992 | Nagashima et al. | |
| 7,136,539 B2 * | 11/2006 | Weyl ..................... | G06T 1/0007 378/43 |

(Continued)

FOREIGN PATENT DOCUMENTS

| | | |
|---|---|---|
| CN | 1993715 A | 7/2007 |
| JP | H04-107994 A | 4/1992 |

(Continued)

OTHER PUBLICATIONS

International Search Report for PCT/JP2012/067089, dated Aug. 21, 2012.

(Continued)

*Primary Examiner* — Leron Beck
(74) *Attorney, Agent, or Firm* — Sughrue Mion, PLLC

(57) ABSTRACT

A rotation unit of an image processor rotates at least any one of a securing unit for securing an object, an illumination unit for illuminating the object secured by the securing unit, and an image reading unit for reading an image of the object secured by the securing unit. A matching value calculation unit calculates the matching value for matching the image read by the image reading unit and the image in an image storing unit for storing images of objects previously read. A controller controls the rotation by the rotation unit based on the matching value calculated by the matching value calculation unit.

10 Claims, 12 Drawing Sheets

(56) References Cited

U.S. PATENT DOCUMENTS

| | | | | |
|---|---|---|---|---|
| 7,382,904 | B2* | 6/2008 | Lee | G06F 1/1616 |
| | | | | 382/124 |
| 7,627,161 | B2* | 12/2009 | Shimizu | G06K 9/00 |
| | | | | 358/1.14 |
| 7,647,193 | B2* | 1/2010 | Francis | G06Q 10/08 |
| | | | | 235/491 |
| 7,856,137 | B2* | 12/2010 | Yonezawa | G06K 9/00899 |
| | | | | 194/328 |
| 8,335,367 | B2* | 12/2012 | Nireki | G07D 7/121 |
| | | | | 209/534 |
| 8,534,543 | B1* | 9/2013 | Eker | G06K 19/10 |
| | | | | 235/375 |
| 8,720,790 | B2* | 5/2014 | Hanina | G06K 9/527 |
| | | | | 235/494 |
| 8,727,208 | B2* | 5/2014 | Poisner | G06K 19/06046 |
| | | | | 235/375 |
| 8,798,329 | B2* | 8/2014 | Muquit | G06K 9/00006 |
| | | | | 382/115 |
| 9,008,411 | B2* | 4/2015 | DeLise, Jr. | G06F 19/326 |
| | | | | 348/135 |
| 2007/0115499 | A1 | 5/2007 | Kimura et al. | |
| 2007/0122022 | A1 | 5/2007 | Shimizu et al. | |
| 2008/0060079 | A1 | 3/2008 | Shimizu et al. | |
| 2008/0196458 | A1* | 8/2008 | Lu | E05B 47/0012 |
| | | | | 70/257 |

FOREIGN PATENT DOCUMENTS

| | | |
|---|---|---|
| JP | 2000-121580 A | 4/2000 |
| JP | 2005-038389 A | 2/2005 |
| JP | 2006-053736 A | 2/2006 |
| WO | 2006/016622 A1 | 2/2006 |

OTHER PUBLICATIONS

English translation of communication dated May 17, 2016 from the State Intellectual Property Office of the P.R.C. in counterpart application No. 201280060613.3.

Communication dated Jul. 8, 2016 from the European Patent Office in counterpart application No. 12864205.5.

Liu et al., "3D Curved Object Recognition from Multiple 2D Camera Views," Computer Vision, Graphics, and Image Processing; vol. 50, No. 2, pp. 177-187 (May 1990).

Defretin et al., "Learning Viewpoint Planning in Active Recognition on a Small Sampling Budget: a Kriging Approach," 2010 Ninth International Conference on Machine Learning and Applications; DOI 10.1109/ICMLA.2010.32; pp. 169-174 (2010).

Roy et al., "Active recognition through next view planning: a survey," Pattern Recognition, Elsevier, GB; vol. 37, No. 3, (2004) pp. 429-446.

Morimoto et al., "A Visual Inspection System for Drug Tablets," Himeji Initiative in Computational Medical and Health Technology, XP031999637 (2011) pp. 1106-1110.

Mozina et al., "Automated visual inspection of imprint quality of pharmaceutical tablets," Machine Vision and Applications; DOI 10.1007/s00138-011-0366-4 (2013) vol. 24, pp. 63-73.

English Translation of Office Action of JP Application No. 2012-000524.

* cited by examiner

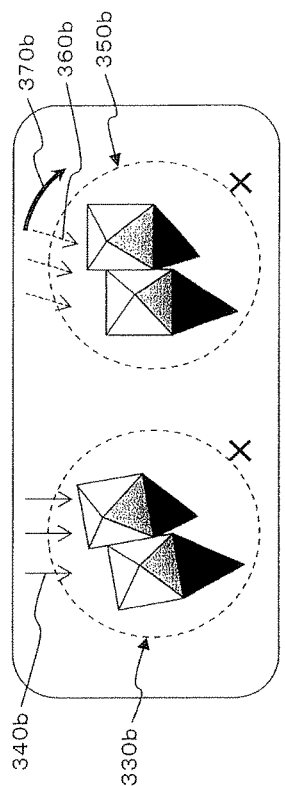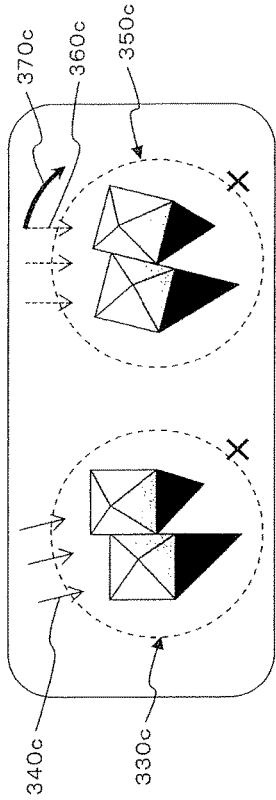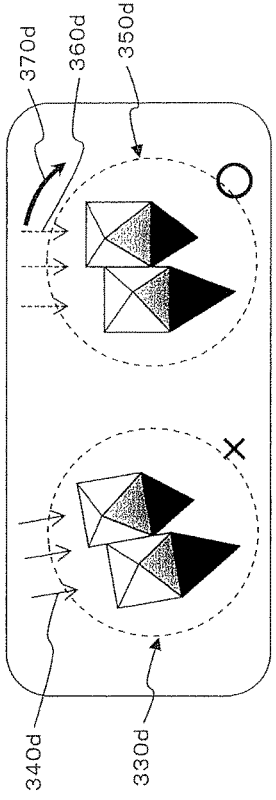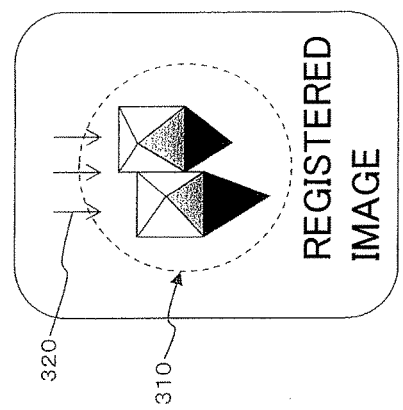

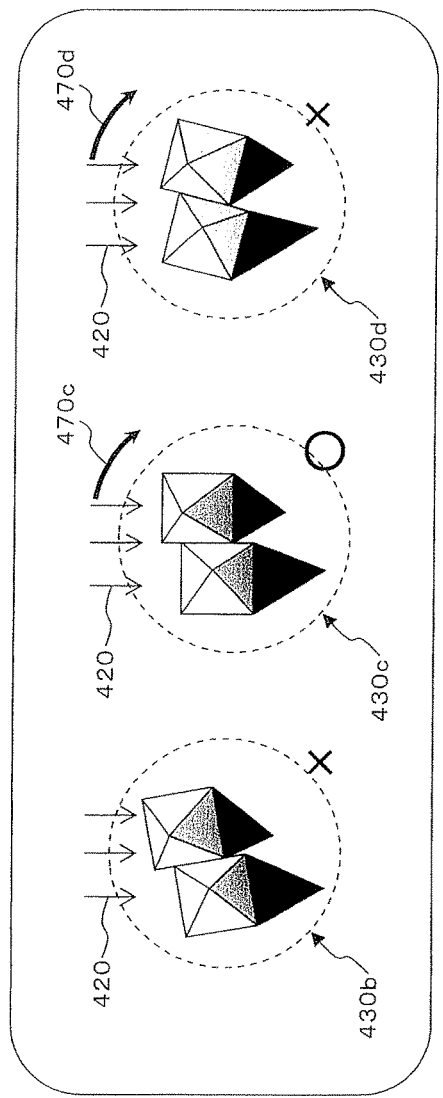
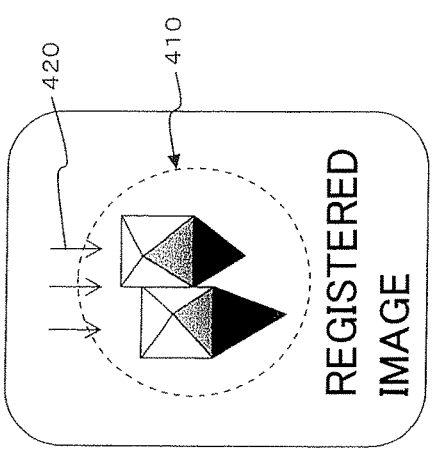
FIG.4D  FIG.4C  FIG.4B  FIG.4A

FIG.6

| ID | IMAGE FILE | ATTRIBUTE ||||
| | | MANUFACTURING NUMBER | MANUFACTURING DATE AND TIME | MANUFACTURING LOCATION | ... |
| | | | | | |

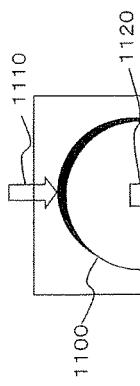
FIG.11A
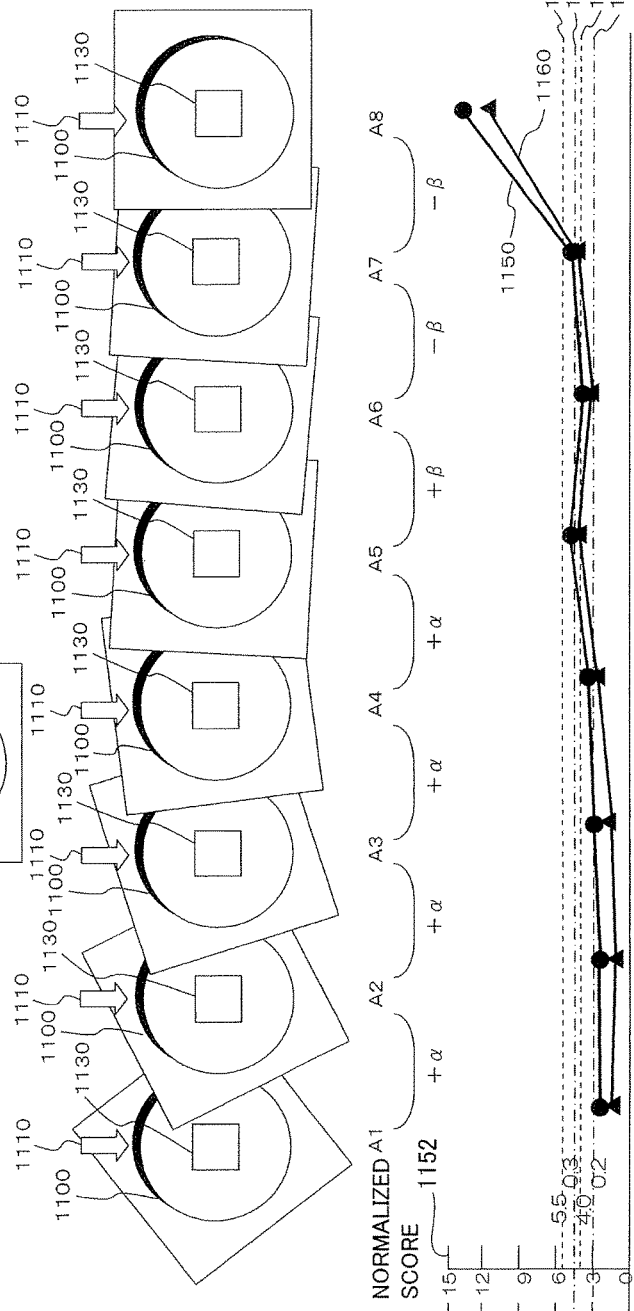
FIG.11B
FIG.11C

Image Processor, Non-Transitory Computer Readable Medium and Object Matching Device

CROSS REFERENCE TO RELATED APPLICATIONS

This application is based on and claims priority under 35 USC §119 from Japanese Patent Application 2012-000524 filed Jan. 5, 2012.

BACKGROUND

Technical Field

The present invention relates to an image processor, a non-transitory computer readable medium and an object matching device.

Related Art

It is desired to, in matching images of objects, provide an image processor and the like capable of matching irrespective of directions of securing the objects, for the purpose of addressing simple and highly accurate authenticity determination for solids.

SUMMARY

According to an aspect of the present invention, there is provided an image processor comprising a rotation unit that rotates at least any one of a securing unit that secures an object, an illumination unit that applies illumination to the object secured by the securing unit, and an image reading unit that reads an image of the object secured by the securing unit; a matching value calculation unit that calculates a matching value for matching the image read by the image reading unit with an image in an image storing unit that stores an image of an object having already been read; and a controller that controls rotation by the rotation unit based on the matching value calculated by the matching value calculation unit.

BRIEF DESCRIPTION OF THE DRAWINGS

Exemplary embodiments of the present invention will be described in detail based on the following figures, wherein:

FIGS. 3A to 3D are illustration diagrams showing an example about matching with a registered image;

FIGS. 4A to 4D are illustration diagrams showing an example about matching with a registered image;

FIG. 6 is an illustration diagram showing a data structure example of a table for registered images of objects;

FIGS. 11A to 11C are illustration diagrams showing a relational example between the normalized score or the maximum value of the correlation values and a matching value in the case where the pill is rotated.

DETAILED DESCRIPTION

Hereinafter, an example of a preferable exemplary embodiment for implementing the present invention will be described with reference to attached drawings.

Figure 1:
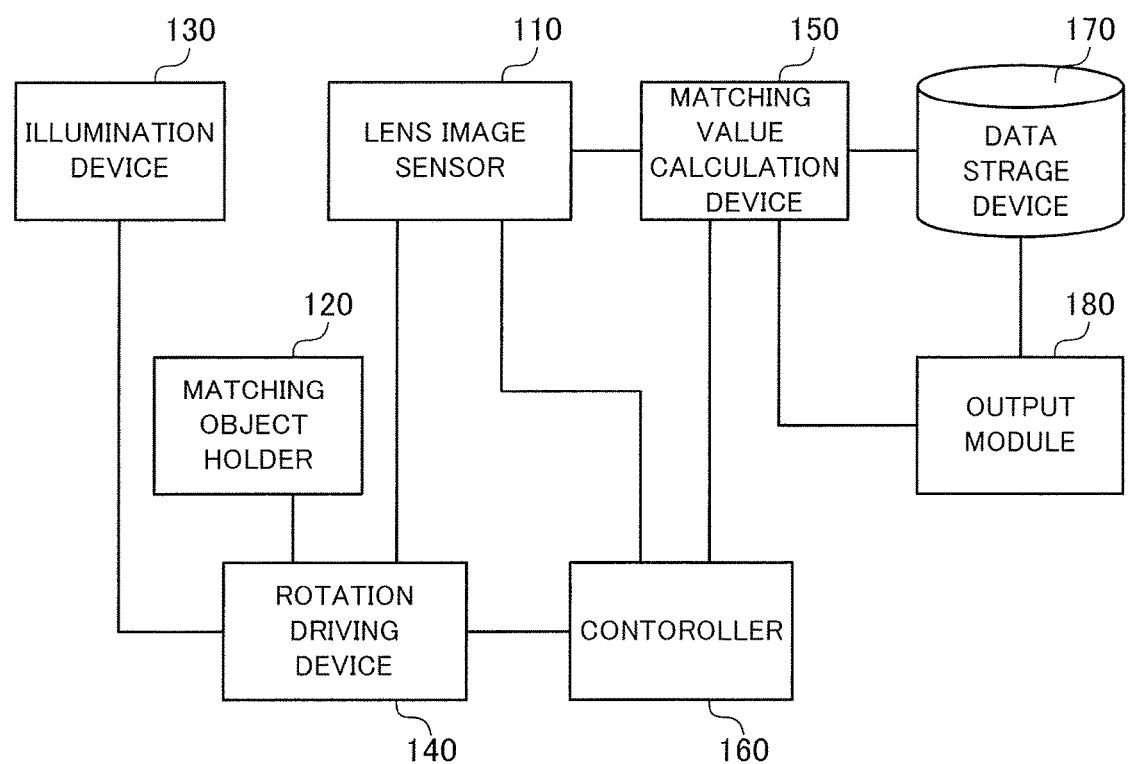
FIG. 1 is a conceptual module configuration diagram of a configuration example of an exemplary embodiment.

FIG. 1 is a conceptual module configuration diagram of a configuration example of the exemplary embodiment.

It should be noted that a module refers to a software component that is logically separable (a computer program), or a hardware component. The module in the exemplary embodiment refers to not only a module in a computer program but also a module in a hardware configuration. The description of the exemplary embodiment also serves as the description of computer programs for causing the modules to function (including a program that causes a computer to execute each procedure, a program that causes the computer to function as each unit, and a program that causes the computer to implement each function), a system and a method. For convenience of description, "stores information," "causes information to be stored," and other phrases equivalent thereto are used; however, if the exemplary embodiment is a computer program, these phrases are intended to express "causes a memory device to store information" or "controls a memory device to cause the memory device to store information." The modules may correspond to the functions in a one-to-one correspondence, however, in implementation, one module may be composed of one program or multiple modules may be composed of one program, and inversely, one module may be composed of multiple programs. Moreover, multiple modules may be executed by a single computer, and a single module may be executed by multiple computers in a distributed environment or a parallel environment. One module may include another module. Moreover, in the following description, "connection" refers to not only a physical connection but also a logical connection (such as an exchange of data, instructions, and data reference relationship). "Predetermined" means that something is decided in advance of a process of interest, and thus intends to refer to something that is decided in advance of a process of interest in the exemplary embodiment or even after a process in the exemplary embodiment has started, and refers to something that is decided in advance of a process of interest depending on a condition or a status of the exemplary embodiment at the present point of time or depending on a condition or status heretofore continuing down to the present point of time. In addition, a statement that means "If A, B is performed" is used to convey the meaning "it is determined whether condition A is satisfied, and if the condition A is satisfied, B is performed". However, this is not applicable if the determination as to whether the condition A is satisfied or not is unnecessary.

Moreover, a system or an apparatus refers to a configuration in which multiple computers, a hardware structure, and an apparatus are interconnected via a communication network (including a one-to-one communication connection), and also includes a case implemented by a single computer, a hardware structure, or an apparatus. The word "system" and the word "apparatus" have the same definition.

Of course, the "system" does not include merely a social "arrangement" (social system) formulated by humans.

At each process performed by a module, or at one of the processes performed by a module, information to be processed is read from a memory device, and then processed, and thereafter, the process results are written onto the memory device. A description of reading of the information from the memory device prior to the process and the writing of the processed information onto the memory device subsequent to the process is omitted in some cases. The memory devices here may include a hard disc, a random access memory (RAM), an external storage medium, a memory device connected via a communication line, a register within a central processing unit (CPU) and the like.

An image processor of the exemplary embodiment conducts matching of an image of an object and includes, as shown in the example of FIG. 1: a lens image sensor 110; a matching object holder 120; an illumination device 130; a rotation driving device 140; a matching value calculation device 150; a controller 160; a data storage device 170; and an output module 180. It should be noted that the image processor may be configured to include the rotation driving device 140, the matching value calculation device 150, the controller 160 and the data storage device 170; in this case, the image processor controls the lens image sensor 110, the matching object holder 120 and the illumination device 130 that are separately provided.

Here, matching refers to determination of authenticity of a pill on a surface of which inherent characteristics that are readable and have randomness are distributed. If a read image of the pill matches with an image of the pill that has already been registered, the pill is determined to be authentic, whereas, if the read image of the pill does not match with any of the images of the pill that has already been registered, the pill is determined to be a fake. The images of the pill that has already been registered are, for example, those read and registered in a manufacturing plant of the pill. Accordingly, the determination serves as determination whether or not the target pill was manufactured in the manufacturing plant, and therefore, the image processor of the exemplary embodiment has a function as a verification machine. Further, if the pill was manufactured in the manufacturing plant (in the case of being authenticated), an attribute of the pill may be provided.

It should be noted that the object may be one on a surface of which inherent characteristics that are readable and have randomness are distributed. The object may be one that can be a matching object, and a substance having coordinateness or a substance difficult to be positioned is applicable, and specifically, for example, pills, electronic components or the like are applicable. Moreover, the pills may include round pills, oval pills or the like. Hereinafter, description will be given by mainly taking a round pill as an example.

The lens image sensor 110 is connected to the rotation driving device 140, the matching value calculation device 150 and the controller 160. Under the control by the controller 160, the lens image sensor 110 reads the image of the pill secured by the matching object holder 120. The pill is illuminated by the illumination device 130, and reflective light thereof is read. Specifically, for example, there exists an image sensor (such as CCD and CMOS), and lens or the like for enabling the lens image sensor 110 to read the image may be included.

The matching object holder 120 is connected to the rotation driving device 140. The matching object holder 120 secures the target pill. It should be note that, in securing the pill, it is unnecessary to determine orientation of the pill.

The illumination device 130 is connected to the rotation driving device 140. The illumination device 130 illuminates the pill secure by the matching object holder 120.

The rotation driving device 140 is connected to the lens image sensor 110, the matching object holder 120, the illumination device 130 and the controller 160. Based on the control by the controller 160, the rotation driving device 140 rotates at least one of the lens image sensor 110, the matching object holder 120 and the illumination device 130. Moreover, the lens image sensor 110 and the illumination device 130 may be paired to be rotated. It should be noted that, if at least two of the lens image sensor 110, the matching object holder 120 and the illumination device 130 are rotated, an angle of rotation is represented by a relative angle. For example, in the case where the matching object holder 120 is rotated 5 degrees in the clockwise direction and the illumination device 130 is rotated 5 degrees in the counterclockwise direction, the pill is turned out to be rotated 10 degrees in the clockwise direction. It should be noted that, in the following description, it is assumed that the rotation direction means the rotation direction as the pill is viewed from above; however, any direction may be assumed to be positive or negative. Moreover, hereinafter, description will be given by using a case where a pair of the lens image sensor 110 and the illumination device 130 is rotated as one piece while securing (without rotating) the matching object holder 120 and a case where the matching object holder 120 is rotated while securing (without rotating) the lens image sensor 110 and the illumination device 130.

Moreover, the rotation means to make differences in shadows generated by asperities on the surface of the image of the pill. The center of rotation is the center of the pill.

The matching value calculation device 150 is connected to the lens image sensor 110, the controller 160, the data storage device 170 and the output module 180. The matching value calculation device 150 calculates a matching value for matching the image read by the lens image sensor 110 with an image in the data storage device 170 that stores images of the pill having already been read. As a matter of course, the matching value calculation device 150 also calculates matching values for an image after rotation of a first rotation angle is performed and an image after rotation of a second rotation angle is performed.

Moreover, the matching value calculation device 150 may calculate a maximum value of correlation values or a normalized score as the matching value. In this case, a first threshold value and a second threshold value, which will be descried later, are the threshold values in the maximum value of the correlation values or the normalized score.

The controller 160 is connected to the lens image sensor 110, the rotation driving device 140 and the matching value calculation device 150. Based on the matching value calculated by the matching value calculation device 150, the controller 160 controls rotations by the rotation driving device 140.

Moreover, the controller 160 may compare the matching value calculated by the matching value calculation device 150 with the second threshold value that is a threshold value indicating to match less than the first threshold value, and in a second case that is a comparison result in which the image read by the lens image sensor 110 is not determined to be the image in the storage device 170, the controller 160 may control the rotations by the rotation driving device 140 to perform the rotations at the first rotation angle that is a predetermined angle of rotation.

Moreover, the controller 160 compares the matching value calculated by the matching value calculation device 150 with the first threshold value and the second threshold value, and if the result is neither the first case nor the second case, the controller 160 may control the rotations by the rotation driving device 140 to perform the rotations at the second rotation angle which is smaller than the first rotation angle. The second threshold value is also a predetermined value.

Moreover, the controller 160 may compare the matching value of this time and the former matching value to control the direction of rotations by the rotation driving device 140.

Further, when the matching process is finished (when a comparison result is obtained, by which the image read by the lens image sensor 110 can be determined to be the image in the data storage device 170, or, when a matching image does not exist in the data storage device 170 even though 360-degree rotation is performed), to perform the matching process on the next pill, the controller 160 controls the matching object holder 120 to secure the next pill and the lens image sensor 110 to read an image of the pill.

The data storage device 170 is connected to the matching value calculation device 150 and the output module 180. The data storage device 170 stores the images of the pill that have already been read. Moreover, the data storage device 170 may also store attributes associated with the images.

The output module 180 is connected to the matching value calculation device 150 and the data storage device 170. The output module 180 compares the matching value calculated by the matching value calculation device 150 with the first threshold value that is a predetermined threshold value, and in the first case, which is a comparison result capable of determining the image read by the lens image sensor 110 to be the image in the data storage device 170, outputs an attribute associated with the image in the data storage device 170. In the case where there is no matching image in the data storage device 170 even though the 360-degree rotation is performed, the output module 180 outputs information indicating that there is a high possibility that the target pill is a fake.

Outputting includes, for example, printing by a printing machine such as a printer, displaying on a displaying device such as a display, transmitting an image by an image transmitting device such as a facsimile, storing in a storing medium such as a memory card, passing to other information processing devices, and the like.

Figure 2:
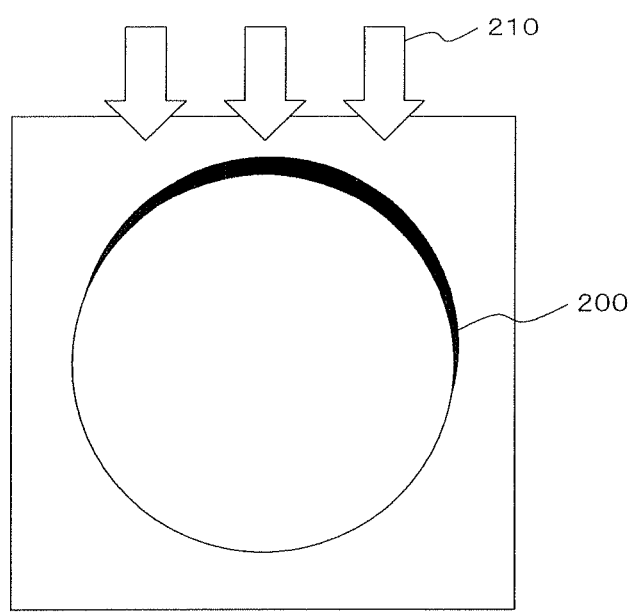
FIG. 2 is an illustration diagram of an example of a pill that is an object to be processed according to the exemplary embodiment.

FIG. 2 is an illustration diagram showing an example of a pill that is an object to be processed according to the exemplary embodiment. In other words, the figure shows an example of an image of a pill taken by oblique illumination.

In this example, light is applied from an illuminating direction 210. Accordingly, shadows of asperities on the surface of a pill 200 are formed on a lower side. Assuming that this image (may be a part of the image) is a registered image stored in the data storage device 170, even the same pill (namely, an authentic pill) is not determined to be authentic if the rotation of the image to be matched is deviated in comparison with the registered image, or a light source direction when matching is performed is different from that when registration is conducted (even though the rotation is not deviated).

If there is a difference in the light source direction between the time of registration and the time of matching (not less than a certain value, for example, not less than 10 degrees), it is impossible to correct the rotations by image processing. This example will be described by use of FIGS. 3A to 3D. FIGS. 3A to 3D are illustration diagrams showing an example about matching with a registered image. Specifically, the figure is a schematic diagram of shadows of asperities on a surface of a pill, and since shadows are apt to be formed in the oblique illumination, rotation correction by image processing is unavailable. For example, as shown in an example of FIG. 3A, in the case where illumination is applied from an illuminating direction 320 to the asperities on the surface of the pill, shadows as shown in the figure are generated, and the image becomes a registered image 310. Then, assuming that an image for matching in the authentic pill is a photographed image in matching 330b on the left side of FIG. 3B (in this example, orientation of the pill is different from the registered image), there are differences in the shape of the shadows from the registered image 310. Consequently, the registered image 310 and the photographed image in matching 330b are not consistent with each other. Moreover, in the case where the rotation correction by image processing is performed on the photographed image in matching 330b, that is, as a rotation (image processing) image 350b on the right side of FIG. 3B, even if rotation as image processing in a rotation direction 370b is applied to the photographed image in matching 330b, since the image is illuminated from the illumination direction 360b after all, a shape of the shadows is different from the registered image 310, and accordingly, the registered image 310 and the rotation (image processing) image 350b are not consistent with each other.

In the same manner, assuming that the image for matching is a photographed image in matching 330c on the left side of the FIG. 3C (in this example, though the orientation of the pill is same as that of the registered image, the illumination direction is different), the shape of shadows is different from that of the registered image 310. Consequently, the registered image 310 and the photographed image in matching 330c are not consistent with each other. Moreover, in the case where the rotation correction by image processing is performed on the photographed image in matching 330c, that is, a rotation (image processing) image 350c on the right side of FIG. 3C, even if rotation as image processing in a rotation direction 370c is applied to the photographed image in matching 330c, since the image is illuminated from the illumination direction 360c after all, a shape of the shadows is different from the registered image 310, and accordingly, the registered image 310 and the rotation (image processing) image 350c are not consistent with each other.

On the other hand, assuming that the image for matching is a photographed image in matching 330d on the left side of the FIG. 3D (in this example, the orientation of the pill is different from that of the registered image, and the illumination direction is also different just as much as the difference in orientation of the pill), the registered image 310 and the photographed image in matching 330d are not consistent with each other.

However, if the rotation correction by the image processing is performed on the photographed image in matching 330d, that is, as a rotation (image processing) image 350d on the right side of FIG. 3D, if rotation as image processing in a rotation direction 370d is applied to the photographed image in matching 330d, the registered image 310 and the rotation (image processing) image 350d are consistent with each other. In other words, rotation by image processing causes matching to be available. However, this is because positional relationship between the illumination direction of light and the object is coincidentally the same with that in the time of registration. More specifically, further, positional relationship between the illumination and the image sensor is also required to be the same with that in the time of registration. Accordingly, in the oblique illumination, since the shape of the shadows changes depending on the direction of light, the rotation correction by image processing is rarely effective.

Accordingly, in the oblique illumination, a method of physically rotating should be adopted. The matching object holder 120 or the lens image sensor 110 and the illumination device 130 (a relative positional relationship between the lens image sensor 110 and the illumination device 130 is secured) are rotated. If the pill is "authentic", the read image of the pill is consistent with the registered image at somewhere of the rotation angle. This example will be described by use of FIGS. 4A to 4D. FIGS. 4A to 4D are illustration diagrams showing an example about matching with a registered image. For example, as shown in an example of FIG. 4A, if illumination is applied from an illumination direction 420 with respect to asperities on a surface of a pill, shadows as shown in the figure are generated, and this image becomes a registered image 410. Then, assuming that an image for matching in the authentic pill is a photographed image in matching 430b as shown in an example of FIG. 4B (in this example, orientation of the pill is different from that of the registered image), there is a difference in the shape of the shadows from the registered image 410. Consequently, the registered image 410 and the photographed image in matching 430b are not consistent with each other. However, an image in the case where the illumination direction 420 is not changed and the pill is rotated in a rotation direction 470c looks like a photographed image in matching 430c, and is consistent with the registered image 410. As a matter of course, an image of a case where the pill is further rotated in a rotation direction 470d looks like a photographed image in matching 430d, and is not consistent with the registered image 410.

Figure 5:
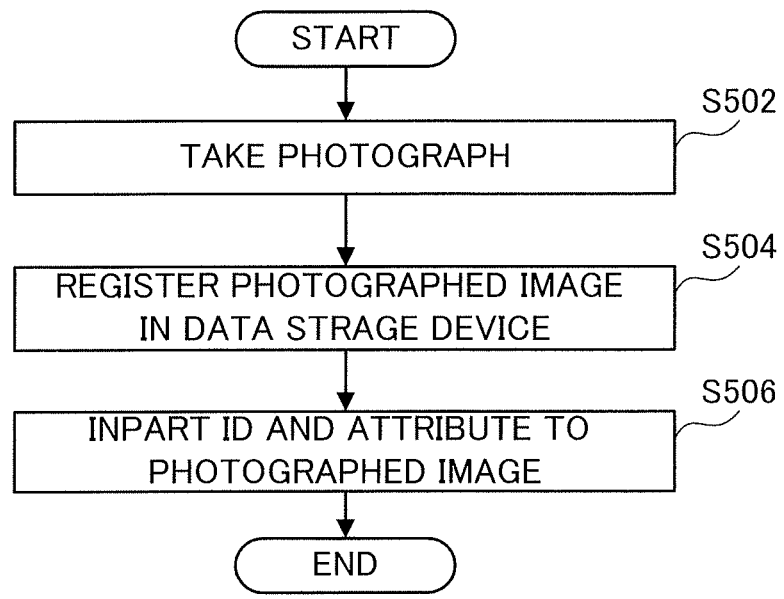
FIG. 5 is a flowchart showing a processing example according to the exemplary embodiment.

FIG. 5 is a flowchart showing a processing example (an example of a generation process of a registered image) according to the exemplary embodiment. It should be noted that, though an example in which the generation process of the registered image is performed according to the exemplary embodiment exemplified in FIG. 1 is shown; however, the exemplary embodiment exemplified in FIG. 1 may not necessarily perform the generation process of the registered image. Here, the matching value calculation device 150 performs the image registration process.

In step S502, the lens image sensor 110 takes a picture of the pill to obtain a photographed image.

In step S504, the matching value calculation device 150 registers the photographed image (an image of the pill as a whole or an image of a part of the pill) in the data storage device 170.

Figure 6:
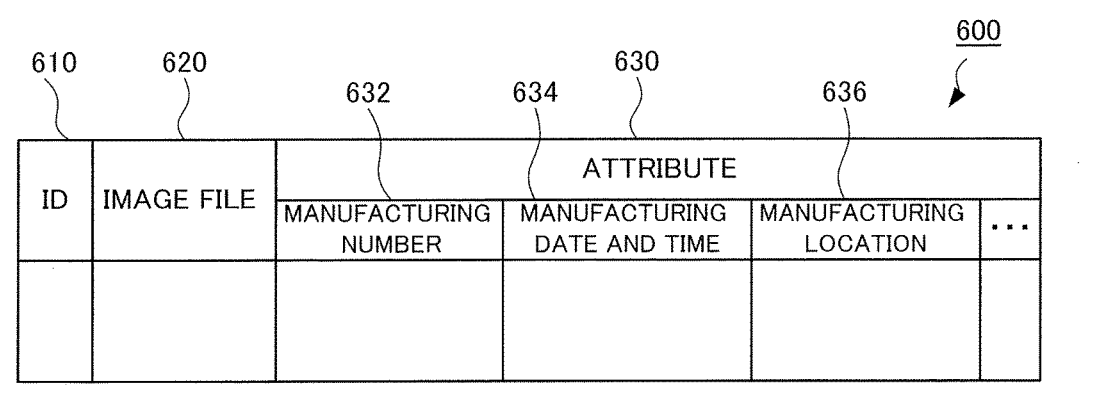

In step S506, the matching value calculation device 150 imparts an ID, an attribute and the like to the photographed image. For example, a table for registered images of objects 600 may be generated and stored in the data storage device 170. FIG. 6 is an illustration diagram showing a data structure example of the table for registered images of objects 600. The table for registered images of objects 600 includes: an ID field 610; an image file field 620; and an attribute field 630. The attribute field 630 includes: a manufacturing number field 632; a manufacturing date and time field 634; a manufacturing location field 636 and the like. The ID field 610 stores information capable of uniquely identifying an image in the exemplary embodiment (ID: identification). The image file field 620 stores a file name of a registered image. The attribute field 630 stores attributes imparted to an image of the pill. The manufacturing number field 632 stores a manufacturing number of a pill of the image. The manufacturing date and time field 634 stores a manufacturing date and time of a pill of the image. The manufacturing location field 636 stores a manufacturing location (a name of a manufacturing plant or the like) of a pill of the image.

Figure 7:
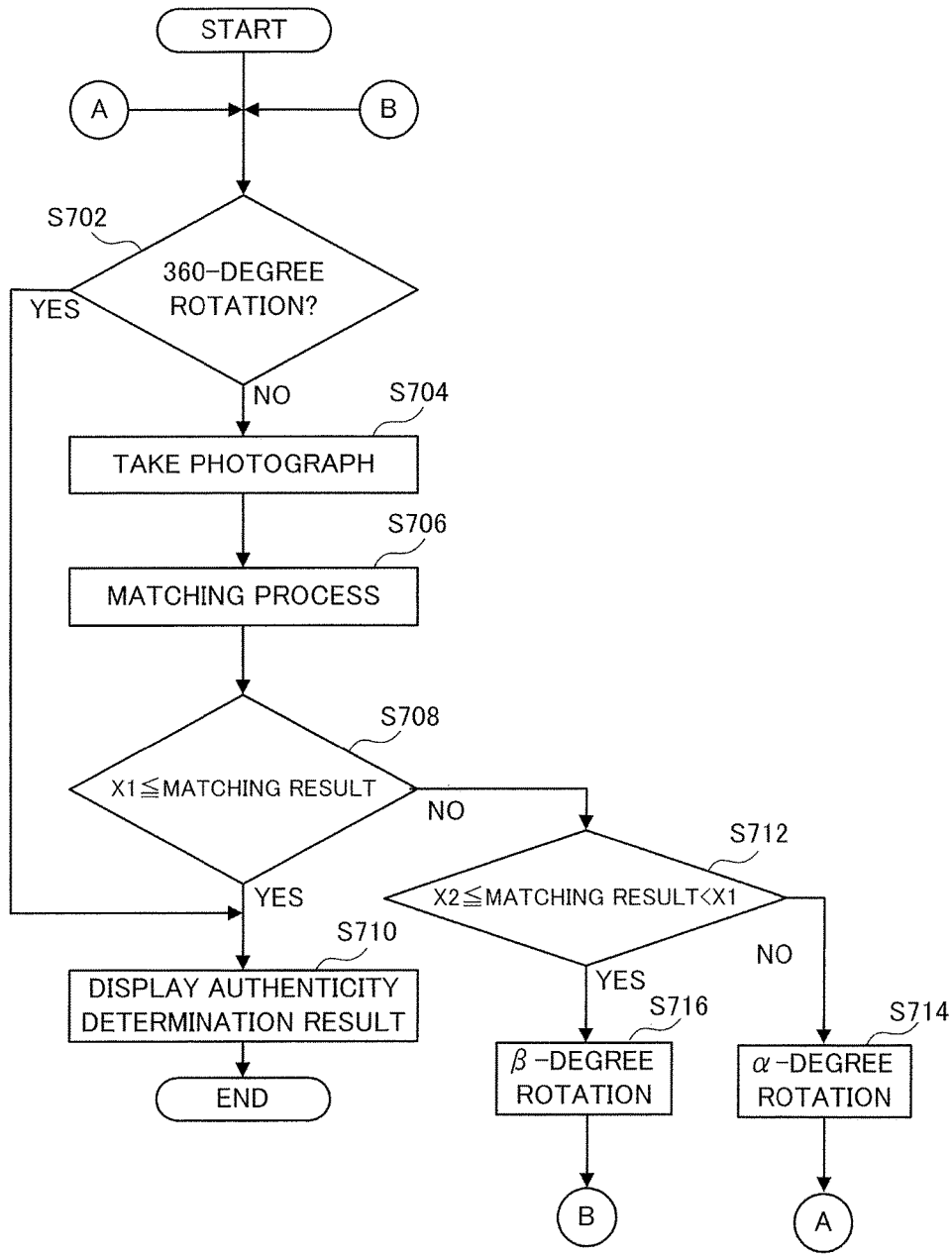
FIG. 7 is a flowchart showing a processing example according to the exemplary embodiment.

FIG. 7 is a flowchart showing a processing example (a matching process example (1)) according to the exemplary embodiment.

In step S702, the controller 160 determines whether or not any of the matching object holder 120, the pair of the lens image sensor 110 and the illumination device 130 has already been subjected to the rotation process of not less than 360 degrees, and if rotation of not less than 360 degrees has already been performed, the process proceeds to step S710, and in other cases, the process proceeds to step S704.

In step S704, the lens image sensor 110 takes a picture of a pill to obtain a photographed image.

In step S706, the matching value calculation device 150 performs the matching process. A matching value for matching an image read in step S704 (an image of the pill as a whole or an image of a part of the pill, and hereinafter, also referred to as a matching image) with a registered image in the data storage device 170 that stores images of the pill having already been read is calculated. It should be noted that, here, the matching value indicates that the larger the matching value is, the more the two images match with each other.

For example, as the matching value, a maximum value of correlation values or a normalized score is calculated. For this calculation process, the technique shown in Patent Document 1 or the like may be used. More specifically, a partial region having the same size as the registered image is extracted from the matching image, and operation of a correlation value of the partial region and the registered image by using a normalized correlation method (refer to the next expression (1)) is repeated while shifting the position of the partial region on the matching image by 1 dot (pixel) in both X-direction and Y-direction.

[Expression 1]

$$F = \{f_i\}_{i=0}^{N-1} \quad (1)$$
$$G = \{g_i\}_{i=0}^{N-1}$$

$$\text{Correlation value} = \frac{\sum_{n=0}^{N-1}(f_n - f_{AVE})(g_n - g_{AVE})}{\sqrt{\sum_{n=0}^{N-1}(f_n - f_{AVE})^2}\sqrt{\sum_{n=0}^{N-1}(g_n - g_{AVE})^2}}$$

F represents the registered image, $f_i$ represents a lightness value of each pixel in the registered image, N represents a total pixel number of the registered image (and the partial region of the matching image), G represents (a set of) partial regions in the matching image, $g_i$ represents a lightness value of each pixel in the partial region of the matching image, $f_{AVE}$ represents an average value of lightness values of respective pixels in the registered image, and $g_{AVE}$ represents an average value of lightness values of respective pixels in the partial region of the matching image. By performing the operation of expression (1) on the matching image, on an assumption that the number of dots in the registered image is m×n, and the number of dots in the matching image is M×N, (M−m+1)×(N−n+1) correlation values are obtained per a single matching image. A maximum value of the correlation values is the maximum value of the correlation values calculated by the matching value calculation device 150 in step S706.

Subsequently, with respect to the matching image, as a feature amount indicating a distribution manner of the correlation values, a normalized score of the maximum value of the correlation values is calculated according to the following expression (2).

Normalized score=(maximum value of correlation values−average value of correlation values)/ standard deviation of correlation values (2)

It should be noted that the matching value calculation device 150 may calculate at least one of the maximum value of the correlation values and the normalized score.

In step S708, the matching value calculation device 150 determines whether or not X1≤matching result (matching value), and if X1≤matching result, the process proceeds to step S710, and in other cases, the process proceeds to step S712.

Here, the threshold value X1 is a threshold value for the maximum value of the correlation values in the case where the matching value calculated in step S706 is the maximum value of the correlation values, and the threshold value X1 is a threshold value for the normalized score in the case where the matching value calculated in step S706 is the normalized score. Moreover, in the case where the matching value calculated in step S706 is the maximum value of the correlation values and the normalized score, there are two threshold values X1 (X1(A) is a threshold value for the maximum value of the correlation values, and X1(B) is a threshold value for the normalized score), and if X1(A) ≤matching result (maximum value of correlation values) and X1(B)≤matching result (normalized value), the process proceeds to step S710, and in other cases, the process proceeds to step S712. Specific threshold values will be described later using an example of FIG. 10.

In step S710, the output module 180 displays authentication determination results and the like. For example, as an authentication determination result of a target pill, in the case where the image taken by the lens image sensor 110 is consistent with a registered image in the data storage device 170 (Y in step S708), the output module 180 displays that the pill of the photographing target is authentic on a display or the like, whereas, in the case where the image taken by the lens image sensor 110 is not consistent with any registered image in the data storage device 170 in spite of conducting rotation of not less than 360 degrees (Y in step S702), the output module 180 displays that the pill of the photographing target is a fake on a display or the like. Moreover, in the case where the pill is authentic, attributes in the table for registered images of objects 600 corresponding to the registered image may be displayed.

In step S712, it is determined whether or not X2≤matching result<X1, and if X2≤matching result<X1, the process proceeds to step S716, and in other cases, the process proceeds to step S714.

Here, X2 and X1 have a relation of X2<X1. That is, X2 is a threshold value indicating to match less than X1.

In step S714, the controller 160 controls the rotation driving device 140 so that any of the matching object holder 120 and the pair of the lens image sensor 110 and the illumination device 130 is rotated α degrees. Then, the process returns to step S702.

In step S716, the controller 160 controls the rotation driving device 140 so that any of the matching object holder 120 and the pair of the lens image sensor 110 and the illumination device 130 is rotated β degrees. Then, the process returns to step S702. It should be noted that α and β have a relation of α>β.

Figure 8:
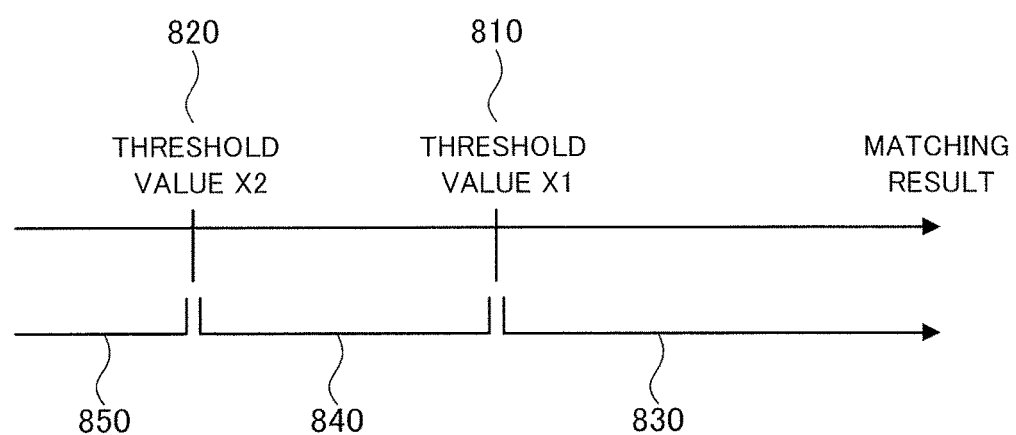
FIG. 8 is an illustration diagram showing a relational example between threshold values and a matching result.

These relations will be described by use of an example of FIG. 8. FIG. 8 is an illustration diagram showing a relational example between the threshold values and the matching result. The figure shows that if the matching result is not less than the threshold value X1:810, the matching result is in an authentic region 830, which is the case of Y in step S708, and thereby a display to show that the pill is authentic is conducted. If the matching result is less than the threshold value X2:820, the matching result is in a non-authentic region 850, which is the case of N in step S712, and then, in step S714, the rotation process of a degrees (for example, 10 degrees) is performed. If the matching result is not less than the threshold value X2:820 and also less than the threshold value X1:810, the matching result is in a fine-adjustment region 840, which is the case of Y in step S712, then, in step S716, the rotation process of β degrees (for example, 2 degrees) is performed.

Figure 9:
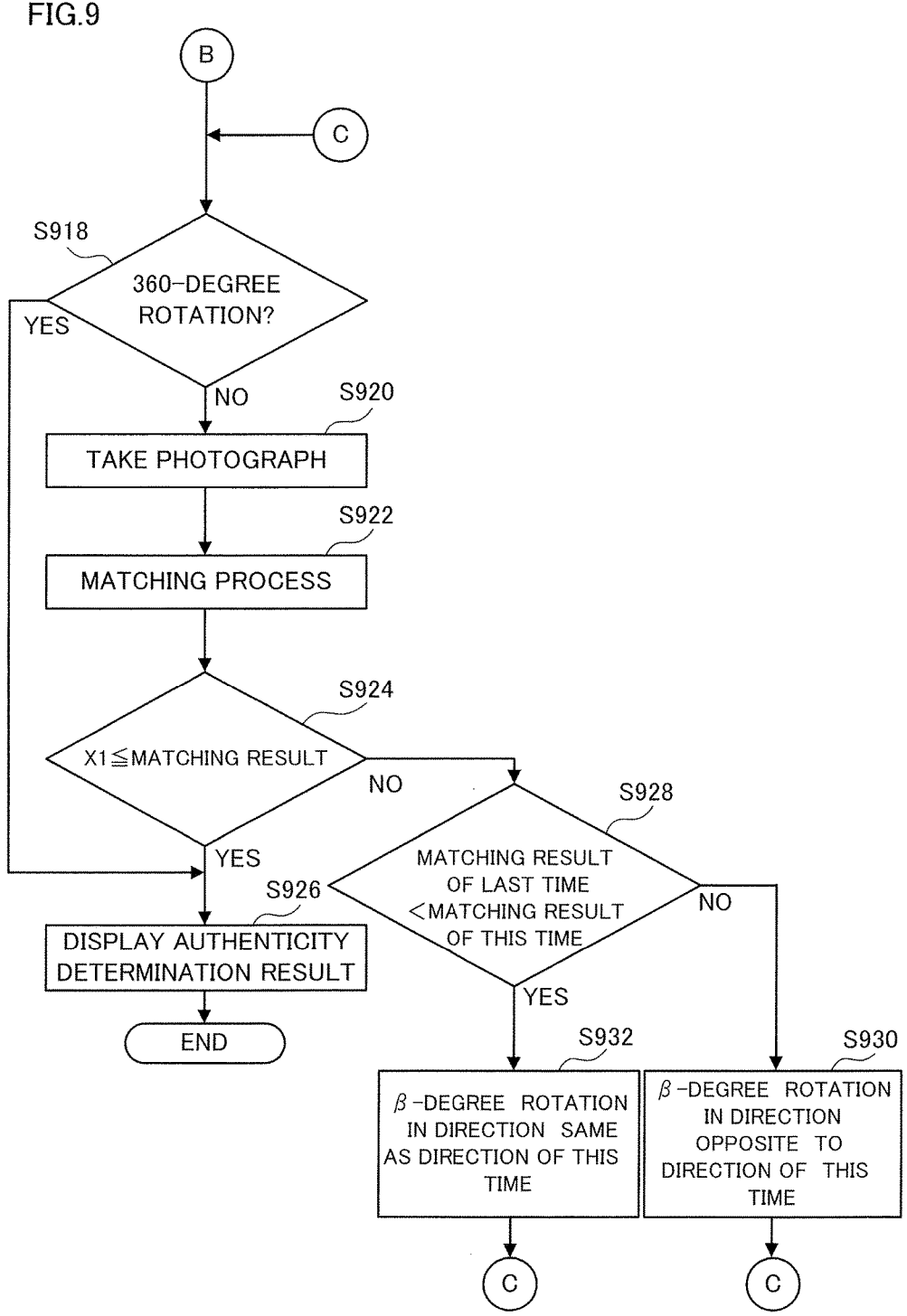
FIG. 9 is a flowchart showing a processing example according to the exemplary embodiment.

FIG. 9 is a flowchart showing a processing example (a matching process example (2)) according to the exemplary embodiment. In the flowchart shown in the example of FIG. 7, after step S716, the process returns to step S702; however, the process shown in the example of FIG. 9 may be performed. Here, the process is for the case where the matching value is in the fine-adjustment region 840 exemplified in FIG. 8, which also controls the rotation direction.

In step S918, the controller 160 determines whether or not the rotation process of not less than 360 degrees has already been performed, and in the case where the rotation of not less than 360 degrees has been performed, the process proceeds to step S926, and in other cases, the process proceeds to step S920.

In step S920, the lens image sensor 110 takes a picture of the pill to obtain a photographed image.

In step S922, the matching value calculation device 150 performs the matching process. The process is the same as step S706 exemplified in FIG. 7.

In step S924, the matching value calculation device 150 determines whether or not X1≤matching result (matching value), and in the case where X1≤matching result, the process proceeds to step S926, and in other cases, the process proceeds to step S928. The process is the same as step S708 exemplified in FIG. 7.

In step S926, the output module 180 displays authenticity determination results and the like. The process is the same as step S710 exemplified in FIG. 7.

In step S928, it is determined whether or not matching result of last time<matching result of this time, and in the case where matching result of last time<matching result of this time (the case of approaching a consistency direction), the process proceeds to step S932, and in other cases (the case of moving away from a consistency direction), the process proceeds to step S930. It should be noted that, here, the matching result of the last time means a matching result in a matching process having been performed immediately before the matching process of this time.

In step S930, the controller 160 controls the rotation driving device 140 so that any of the matching object holder 120 and the pair of the lens image sensor 110 and the illumination device 130 is rotated β degrees in a direction opposite to the direction of this time. Then, the process returns to step S918. The rotation direction of this time refers to the rotation direction in the rotation process performed immediately before taking a picture in step S920.

In step S932, the controller 160 controls the rotation driving device 140 so that any of the matching object holder 120 and the pair of the lens image sensor 110 and the illumination device 130 is rotated β degrees in a direction same as the direction of this time. Then, the process returns to step S918.

Moreover, in the case where, after the rotation process of β degrees at least one time is performed, the direction of rotation in the next time is opposite to that of this time is happened at least two times successively (in the case where a reciprocating motion is performed), any of the following processes may be performed by the controller 160. This is performed for getting out of the so-called local minimum state.

(1) to control so that the rotation process of α degrees is performed in any direction.
(2) to so that the rotation process of an angle smaller than β degrees is performed in the rotation direction of this time.
(3) to control so that the rotation process of an angle other than β degrees is performed in any direction, and to reset the determination process of whether or not the rotation process of 360 degrees has been performed (that is, to return to the initial state for setting a state where the rotation process has not been performed yet), and then cause the process to return to step S702.

Figure 10:
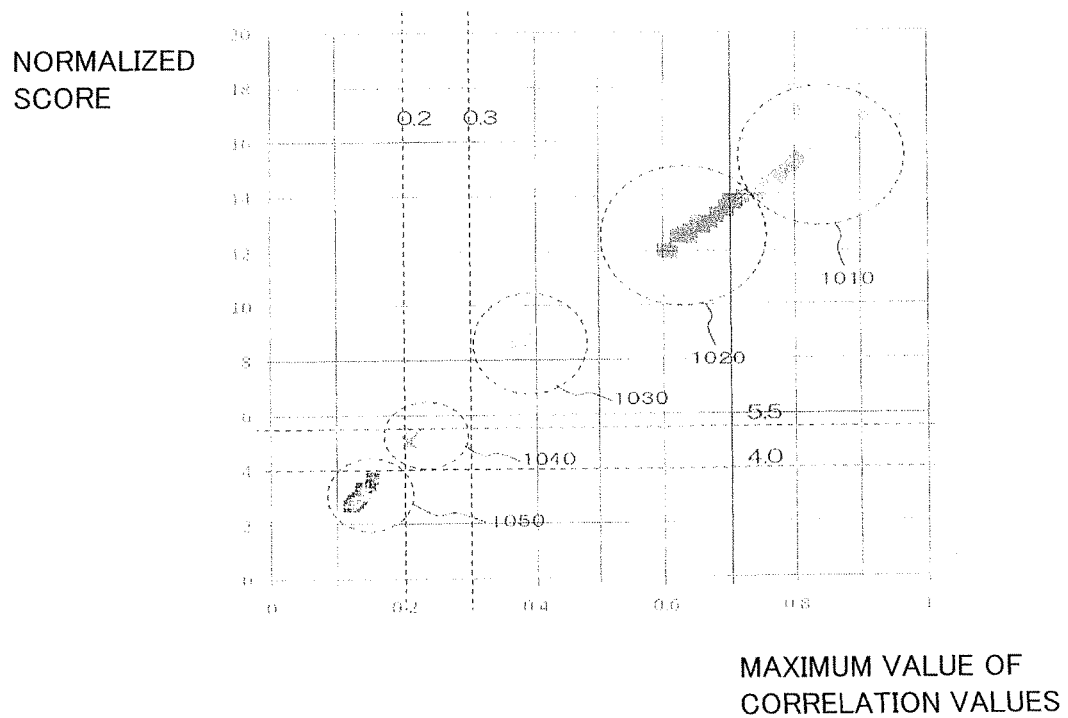
FIG. 10 is a graph showing a relational example between a normalized score or a maximum value of correlation values and a matching value.

FIG. 10 is a graph showing a relational example (an experimental result example) between the normalized score or the maximum value of the correlation values and the matching value. The graph shows changes in "maximum value of correlation values" and "normalized score" caused by rotation.

The graph is an experimental result in which, with respect to a registered image of a round pill having a diameter of 8 mm taken by use of oblique illumination by an LED (600 dpi, 32×32 pixels, 20 pills), a matching process was performed using the same 20 pills, and the graph includes the maximum value of the correlation values as the horizontal axis, the normalized score as the vertical axis, and plotted matching values. A group 1010 shows a matching value group in the case where a difference in the rotation angle between the registered image and the matching image is 0 degree. A group 1020 shows a matching value group in the case where a difference in the rotation angle between the registered image and the matching image is 1 degree. A group 1030 shows a matching value group in the case where a difference in the rotation angle between the registered image and the matching image is 2 degrees. A group 1040 shows a matching value group in the case where a difference in the rotation angle between the registered image and the matching image is 5 degrees. A group 1050 shows a matching value group in the case where a difference in the rotation angle between the registered image and the matching image is not less than 10 degrees.

In other words, if the rotation angle between the registration time and the matching time is not more than 2 degrees, the result exceeds the usual threshold value (for example, the maximum value of the correlation values≈0.3, the normalized score≈5.5) and is determined to be authentic (the group 1010, the group 1020 and the group 1030); however, if the rotation is of not less than 10 degrees, the result is determined as a fake in spite of being authentic (the group 1050). As the above-described threshold value X1, the maximum value of the correlation values≈0.3 and the normalized score≈5.5 may be adopted. It should be noted that "fake" here refers to a state incapable of determining to be authentic, and also includes a case capable of determining to be authentic by conducting the rotation process of the pill.

The rotation angle therebetween (for example, 5 degrees, the group 1040) has a value that is higher than "fake" but is not sufficiently high as to be determined to be "authentic". In such a case, the rotation angle is subjected to fore-and aft changing to perform to make certain (the flowchart exemplified in FIG. 9). As the above-described threshold value X2, the maximum value of the correlation values≈0.2 and the normalized score≈4.0 may be adopted.

FIGS. 11A to 11C are illustration diagrams showing a relational example between the normalized score or the maximum value of the correlation values and a matching value in the case where the pill is rotated.

The registered image is shown in an example of FIG. 11A. It is assumed that the registered image is an image in the case where illumination is applied to a pill 1100 from an illumination direction 1110, and an image of a registration region 1120 is registered in the data storage device 170.

The matching image is shown in an example of FIG. 11B. It should be noted that the rotation processes were performed from left to right in order, in which the rotation process of α degrees in the clockwise direction was performed four times (A2 to A5) from the initial matching image (A1, the matching image at the left end), the rotation process of β degrees in the same direction was performed once (A6), and the rotation process of β degrees in the counterclockwise direction was performed twice (A7 and A8). It should be noted that, as the matching image, a matching region 1130 is used, whose size is larger than that of the registration region 1120 of the registered image.

A graph of the matching values is shown in an example of FIG. 11C. It should be noted that the matching values (the black circle graph represents the normalized score and the black triangle graph represents the maximum value of the correlation values) are plotted in accordance with positions of the matching images (A1 to A8). The initial rotation angle is α degrees, and when the matching image becomes the state of A5, the matching value is less than the threshold value X1 and not less than the threshold value X2. Accordingly, thereafter, the rotation angle becomes β degrees. Then, when the matching image becomes the state of A6, since the matching value of this time is reduced compared to the matching value of the last time, the rotation process of the reverse rotation is performed. Then, when the matching image becomes the state of A7, since the matching value of this time is increased compared to the matching value of the last time, the rotation process in the same direction (counterclockwise) is performed. Then, when the matching image becomes the state of A8, any of the matching values is not less than the threshold value X1, and accordingly, it is determined that the pill of the matching image is the pill of the registered image (the pill is authentic, not a fake). In the case where the matching value does not become not less than the threshold value X1 and the rotation process of not less than 360 degrees is performed, it is determined that the pill of the matching image is not the pill of the registered image (the pill is a fake, not authentic).

Figure 12:
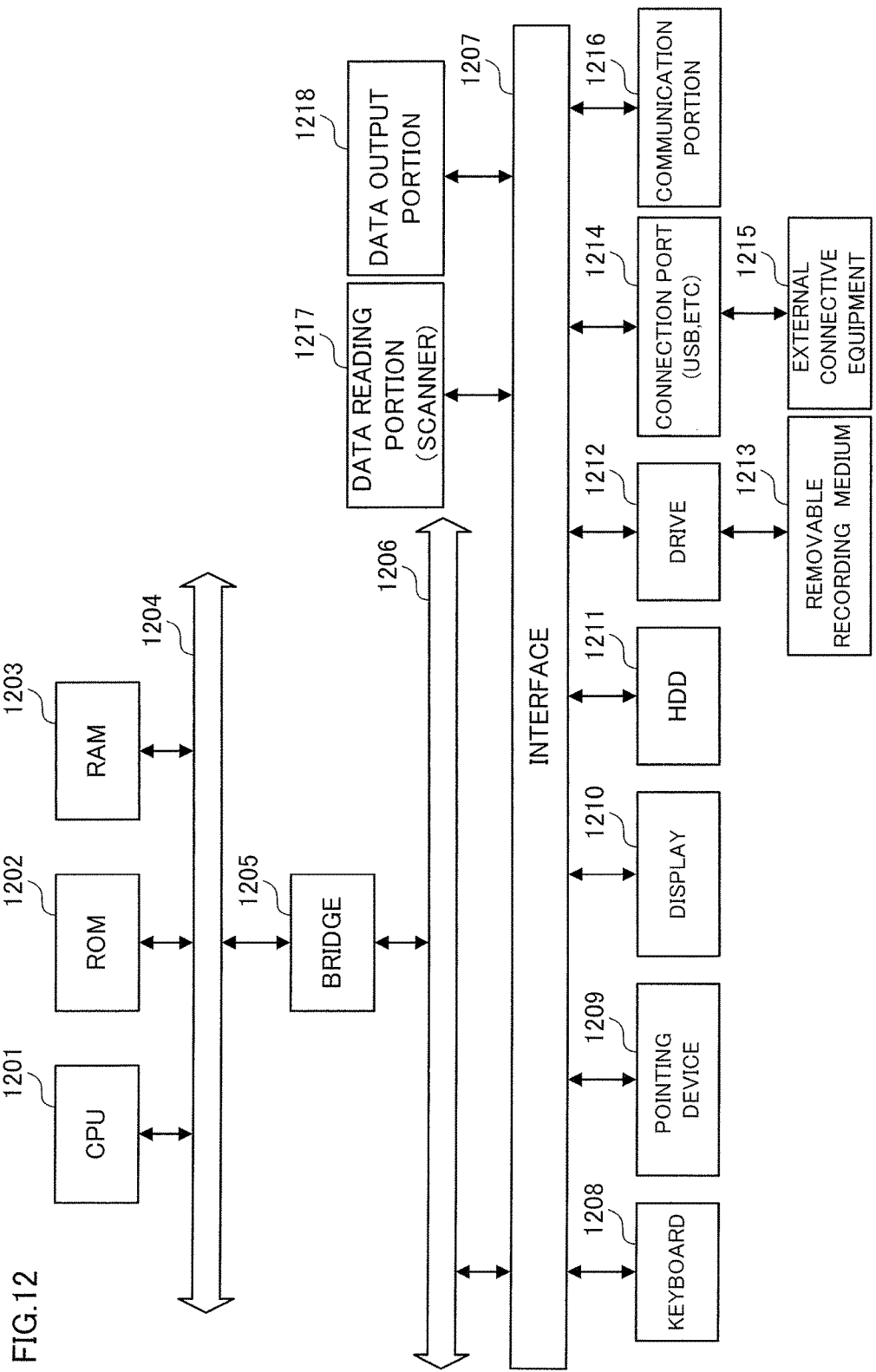
FIG. 12 is a block diagram showing a configuration example of hardware of a computer that implements the exemplary embodiment.

With reference to FIG. 12, a configuration example of hardware of the image processor of the exemplary embodiment will be described. The configuration shown in FIG. 12 is, for example, configured with a personal computer (PC) and the like, and there is shown a hardware configuration example including a data reading portion 1217 such as a scanner and a data output portion 1218 such as a printer.

A CPU (central processing unit) 1201 is a controller that executes processes according to a computer program describing an execution sequence of the various modules described in the above exemplary embodiment, such as the matching value calculation device 150, the controller 160, the output module 180 and the like.

A ROM (read only memory) 1202 stores programs or operating parameters used by the CPU 1201. A RAM (random access memory) 1203 stores programs used in execution by the CPU 1201 or parameters appropriately changing in the execution or the like. These are connected to each other by a host bus 1204 configured with a CPU bus or the like.

The host bus 1204 is connected to an external bus 1206 such as a PCI (peripheral component interconnect/interface) bus via a bridge 1205.

A keyboard 1208 and a pointing device 1209 such as a mouse are input devices operated by an operator. A display 1210 includes a liquid crystal display device, a CRT (cathode ray tube) and the like, and displays various kinds of information as a text or image information.

An HDD (hard disk drive) 1211 contains a hard disk and drives the hard disk to record or replay programs to be executed by the CPU 1201 or information. In the hard disk, the registered images, attribute data thereof, images read by the lens image sensor 110 and the like are stored. Further, various kinds of computer programs such as other various data processing programs are stored.

A drive 1212 reads the data or the programs recorded in an attached removable recording medium 1213 such as a magnetic disk, an optical disk, a magneto-optical disk and a semiconductor memory, and supplies the data or programs to the RAM 1203 connected via an interface 1207, the external bus 1206, the bridge 1205 and the host bus 1204. The removable recording medium 1213 is also usable as a data recording region similar to the hard disk.

A connection port 1214 is a port for connecting external connective equipment 1215 (the lens image sensor 110, the matching object holder 120, the illumination device 130, the rotation driving device 140 and the like), and includes a connection portion for a USB, an IEEE 1394 or the like. The connection port 1214 is connected to the CPU 1201 and the like via the interface 1207, the external bus 1206, the bridge 1205, the host bus 1204 and the like. A communication portion 1216 is connected to a communication line, and performs a data communication process with the outside. The data reading portion 1217 is, for example, a scanner and performs a document reading process. The data output portion 1218 is, for example, a printer and performs an output process of document data.

It should be noted that the hardware configuration of the image processor shown in FIG. 12 indicates one configuration example, and the exemplary embodiment is not limited to the configuration shown in FIG. 12, but may also be a configuration capable of executing the modules described in the exemplary embodiment. For example, part of the modules may be configured with special-purpose hardware (for example, an application specific integrated circuit: ASIC or the like), and further, the plural systems shown in FIG. 12 may be connected with each other via the communication line to cooperate with each other.

It should be noted that, in the above description of the exemplary embodiment, those referred to as "not less than", "not more than", "more (larger) than" or "less (smaller) than" in comparison with the predetermined threshold value may also be referred to as "more (larger) than", "less (smaller) than", "not less than" or "not more than", respectively, unless no contradiction arises in combinations thereof.

Further, in the above description, the matching value is defined so that the larger the value is, the more the two images match with each other; however, the matching value may be defined so that the smaller the value is, the more the two images match with each other. In such a case, a magnitude relationship between the matching value and the threshold value is inverted (specifically, "not less than" is changed to "not more than" or "less (smaller) than, etc.).

Moreover, as described above, the object (the matching object or an origin of the registered image) is not limited to the pill, but may also be a material on a surface of which inherent characteristics that are readable and have randomness are distributed.

The above-described program may be supplied in a stored state on a recording medium, or may also be provided via a communication unit. In such a case, the above-described program may be grasped as an invention of a "computer readable recording medium storing the program".

The "computer readable recording medium storing the program" refers to a computer readable recording medium storing the program, and used to install the program, to execute the program, or to distribute the program.

It should be noted that the recording media include, for example, a digital versatile disc (DVD), such as "DVD-R, DVD-RW, and DVD-RAM" complying with the standard formulated by the DVD forum, and "DVD+R and DVD+RW" complying with DVD+RW standards, a compact disc (CD), such as a read-only memory (CD-ROM), a CD recordable (CD-R) and a CD rewritable (CD-RW), Blu-ray disc (registered trademark), a magneto-optical disc (MO), a flexible disc (FD), a magnetic tape, a hard disk, a read-only memory (ROM), an electronically erasable and programmable read-only memory (EEPROM (registered trademark)), a flash memory, a random-access memory (RAM), and a secure digital (SD) memory.

The above-described program or a part thereof may be stored on the recording medium for storage and distribution. The program or a part thereof may be transmitted via a transfer medium including a wired network, which is used in a local-area network (LAN), a metropolitan-area network (MAN), a wide-area network (WAN), the Internet, an intranet, and an extranet, a wireless network, or a combination thereof. The program or a part thereof may be transmitted over a carrier wave.

Further, the above-described program may be part of another program, or may be stored on the recording medium together with another program. The program may be split to be stored on plural recording media. The program may be processed in any fashion before being stored as long as the program remains restorable, such as being compressed or encrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
 a rotation unit configured to rotate at least any one of an
  illumination unit that is configured to apply illumination to an object secured by a securing unit and an image reading unit that is configured to read an image of the object secured by the securing unit;
a matching value calculation unit configured to calculate a matching value for matching the image read by the image reading unit with an image in an image storing unit that stores an image of an object having already been read;
a controller configured to control rotation by the rotation unit based on only the matching value calculated by the matching value calculation unit; and
an output unit configured to compare the matching value calculated by the matching value calculation unit with a first threshold value, which is a predetermined threshold value, and in a first case that is a comparison result capable of determining that the image read by the image reading unit is the image in the image storing unit, is configured to output an attribute associated with the image in the image storing unit,
wherein the controller is configured to compare the matching value calculated by the matching value calculation unit with a second threshold value, which is a threshold value indicating to match less than the first threshold value, and in a second case that is a comparison result incapable of determining that the image read by the image reading unit is the image in the image storing unit, is configured to control the rotation by the rotation unit so that rotation of a first rotation angle, which is a predetermined rotation angle, is performed.

2. The image processor according to claim 1, wherein the controller is configured to compare the matching value calculated by the matching value calculation unit with the first threshold value and the second threshold value, and in response to a result being neither the first case nor the second case, is configured to control the rotation by the rotation unit so that rotation of a second rotation angle, which is smaller than the first rotation angle, is performed.

3. The image processor according to claim 2, wherein
the matching value calculation unit is configured to calculate a matching value of an image after the rotation of the second rotation angle is performed, and
the controller is configured to compare the matching value of the last time with the matching value of this time, and is configured to control a direction of rotation by the rotation unit.

4. The image processor according to claim 1, wherein
the matching value calculation unit is configured to calculate a maximum value of correlation values or a normalized score as the matching value, and
the first threshold value and a second threshold value are threshold values in the maximum value of the correlation values or the normalized score.

5. The image processor according to claim 1, further comprising a securing unit, the illumination unit and the image reading unit.

6. A non-transitory computer readable medium storing a program causing a computer to execute a process for matching images of objects, the process comprising:
rotating at least one of an illumination unit that is configured to apply illumination to an object secured by a securing unit and an image reading unit that is configured to read an image of the object secured by the securing unit;
calculating a matching value for matching the image read by the image reading unit with an image in an image storing unit that stores an image of an object having already been read;
controlling the rotation based on the matching value; and
comparing the calculated matching value with a first threshold value, which is a predetermined threshold value, and in a first case that is a comparison result capable of determining that the image read is the image in the image storing unit, outputting an attribute associated with the image in the image storing unit,
wherein the comparing the calculated matching value with a second threshold value, which is a threshold value indicating to match less than the first threshold value, and in a second case that is a comparison result incapable of determining that the image read is the image in the image storing unit, controlling the rotation so that rotation of a first rotation angle, which is a predetermined rotation angle, is performed.

7. An object matching device comprising:
a securing unit that secures an object;
an illumination unit configured to apply illumination to the object secured by the securing unit;
an image reading unit configured to read an image of the object secured by the securing unit;
a rotation unit configured to rotate at least one of the illumination unit and the image reading unit;
a matching value calculation unit configured to calculate a matching value for matching the image read by the image reading unit with an image in an image storing unit that stores an image of an object having already been read;
a controller configured to control rotation by the rotation unit based on only the matching value calculated by the matching value calculation unit; and
an output unit configured to compare the matching value calculated by the matching value calculation unit with a first threshold value, which is a predetermined threshold value, and in a first case that is a comparison result capable of determining that the image read by the image reading unit is the image in the image storing unit, is configured to output an attribute associated with the image in the image storing unit, wherein
the matching value calculation unit is configured to calculate the matching value for matching an image of the object, which is obtained every time at least any one of the illumination unit and the image reading unit is rotated at a predetermined angle by the rotation unit, with the image in the image storing unit having already been read, and
the controller is configured to compare the matching value calculated by the matching value calculation unit with a second threshold value, which is a threshold value indicating to match less than the first threshold value, and in a second case that is a comparison result incapable of determining that the image read by the image reading unit is the image in the image storing unit, is configured to control the rotation by the rotation unit so that rotation of a first rotation angle, which is a predetermined rotation angle, is performed.

8. The image processor according to claim 1, wherein the rotation unit is further configured to rotate the securing unit that is configured to secure the object.

9. The non-transitory computer readable medium according to claim 6, wherein the rotating further includes rotating the securing unit that is configured to secure the object.

10. The object matching device according to claim 7, wherein
the rotation unit is further configured to rotate the securing unit, and the matching value is further obtained every time the securing unit is rotated at a predetermined angle by the rotation unit.

\* \* \* \* \*